Patented Dec. 31, 1940

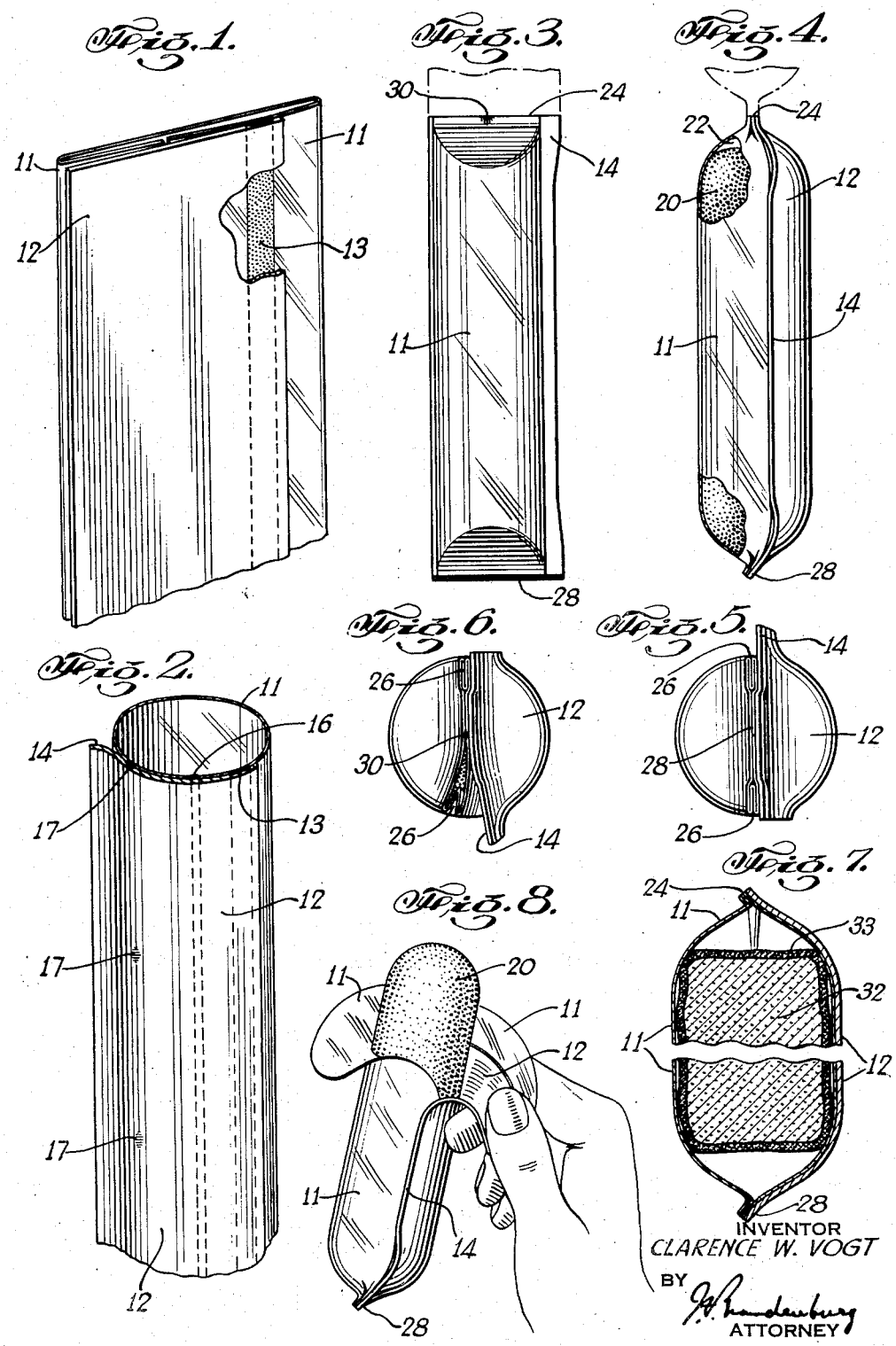

2,227,236

UNITED STATES PATENT OFFICE 2,227,236

PACKAGE FOR FROZEN CONFECTIONS OR THE LIKE

Clarence W. Vogt, Norwalk, Conn., assignor, by mesne assignments, to Owens-Illinois Glass Company, Toledo, Ohio, a corporation of Ohio Application February 7, 1936, Serial No. 62,743
Renewed May 17, 1940

4 Claims. (Cl. 206—56)

This invention relates to packages for frozen confections or similar substances, and particularly to packages for individual portions of products intended to be eaten.

It is an object of the invention to provide an improved package, which is inexpensive, dirt- and germ-proof, and yet easily opened without the use of any implement.

Another object of the invention is to provide a package of the character indicated which can be completely formed, filled and sealed by machine power rather than manually. Another object is to provide an improved bag or package which is sealed at the bottom and can be spread out progressively from the top to expose its contents so that they can be conveniently eaten directly from the container.

In the sale of ice cream there is a large demand for individual portions which the purchaser can take with him and eat on the way. Some of the ice cream for this trade is sold in pasteboard cups, but it is necessary to use a spoon or paddle with these cups and this means that both hands are occupied, one holding the cup and the other the spoon. Some ice cream is sold frozen on one end of a stick, which serves as a handle by which the portion is held while being eaten. When the ice cream begins to melt it runs down the stick or drips and becomes very disagreeable to manage. This difficulty is only partially overcome by coating the ice cream with chlocolate.

The most popular individual portion is the ice cream cone. These can be conveniently held in one hand while being eaten, and the cake portion prevents the ice cream from chilling the consumer's hand.

Ice cream cones are likely to be unsanitary because the cake portion is not wrapped before filling, and is touched by both the salesman and the consumer before being eaten. Cones are often filled from bulk ice cream with dippers, which are sometimes allowed to become quite unsanitary.

In making ice cream sodas, sundaes and various other fountain drinks and dishes, individual portions of ice cream are needed. In the past these portions have usually been supplied from bulk freezers by dippers. In accordance with more modern practice, ice cream is supplied to the store already cut into individual portions separated by paper wrapping. These portions can be unwrapped to make fountain dishes, but the portions are not in sealed packages which can be held in the hand while the purchaser eats the contents.

In accordance with this invention individual portions of ice cream are wrapped in sealed, germ-proof packages which can be opened at the fountain in place of dipping out bulk ice cream, or which can be sold to customers who want to eat the ice cream from the package after leaving the store.

Another object of the invention is to provide a substantially cylindrical package, of thin, flexible, liquid-proof material, constructed at its ends so as to permit the package to fit close against similar packages in a shipping container, and strengthened by a strip of stiffer material attached to the liquid-proof material.

Another object of the invention is to provide an improved pliofilm package with novel features of construction which make it easy to open, suitable as a container from which to eat a comestible, and of advantageous shape for packing in a shipping container with other similar packages.

Although the invention is primarily intended for ice cream, it will be understood that it can be used with other foods, and the package can be used for material which is not to be eaten. This application is a continuation in part of my copending application Serial No. 51,791, filed November 27, 1935.

Other objects, features and advantages of the invention will appear or be pointed out as the specification proceeds.

In the accompanying drawing, forming part hereof:

Fig. 1 is a perspective view of a folded package blank from which the packages of this invention can be made.

Fig. 2 is a perspective view of a folded package blank from which the packages of the present invention are formed.

Figs. 3, 4 and 5 are front, side, and bottom views, respectively, of a package made in accordance with this invention.

Fig. 6 is a top view of the package of Figs. 3—5, partly broken open.

Fig. 7 is an enlarged, fragmentary, sectional view of the package shown in Figs. 3—6, but with different contents.

Fig. 8 is a reduced perspective view showing the manner in which the package is held and peeled back from the top to expose the contents.

The packages are preferably made from a single strip 11 of thin flexible material to which a flexible backing strip 12, which is heavier and stiffer than the material 11, is affixed along one edge by heat-sealing or by an adhesive 13, as shown in Fig. 1. A portion of the package, therefore, is of laminated construction. The backing strip 12 covers the opposed edges of the folded strip 11, and the width of the backing strip 12 is preferably less than that of the folded strip 11 so that the latter is not folded when the assembly is curved into tubular form.

The flexible material from which the strip 11 is formed is a product sold under the trade-mark "pliofilm." This product is thin, flexible, moisture-proof, and transparent, and believed to be composed essentially of a rubberoid material, and probably a form of chlorinated rubber. Pliofilm possesses the characteristics of being readily sealed, fused or welded at a temperature of approximately 115° C. Such fusing causes a substantial reduction in the tensile strength and in the resistance to stretching at the point of fusing.

The strip 12 is preferably paper of "sulphite" or "tag" stock, strong enough to reinforce the pliofilm strip 11 where it is sealed when closing the packages, and stiff enough to give the packages a substantial amount of rigidity so that they will stand up in a container even though the ice cream or other contents are soft and plastic.

The strip 12 protects the pliofilm from direct contact with the heating instrumentalities by which the packages are sealed. When the tube is formed, as shown in Fig. 2, the free edge of the strip 12 extends out from the tube and forms a tab 14 by which the package when formed can be torn open and spread out progressively to expose the contents thereof.

The tabs serve as convenient handles by which the packages may be held while the ice cream in the packages is consumed. The paper of the strip 12 provides enough insulation between the ice cream and the consumer's hand so that the individual packages can be held without discomfort, in the manner illustrated in Fig. 8.

The strip 12 is preferably paper, but I may employ any other suitable sheet material which may be transparent, opaque, or translucent, and which will not be melted or injuriously affected by the application of sufficient heat and pressure to seal together superposed layers of the pliofilm.

The enwrapment shown in Fig. 1 may be smoothly wound on a reel by putting the strip 12 on the side toward the center of the reel. When wound in this manner the pliofilm stretches enough to compensate for the slight difference in diameter of each convolution of paper and its attached convolution of pliofilm.

When the assembled strips 11 and 12 are formed into a tube, such as shown in Fig. 2, the edges of the pliofilm strip 11 extend over one another to form a lap seam 16, and the strip 12 may be sealed coextensively to the pliofilm beyond this seam or secured by spot seals 17. Thus it will be seen that the ice cream in the packages when formed is entirely enclosed by the pliofilm strip 11 and does not come in contact with the paper strip 12. If desired, the lap seam 16 may be dispensed with and the opposed edges of the pliofilm strip 11 will be bridged by the paper strip 12.

The seals 17 add greatly to the strength of the packages while at the same time providing longitudinal sealing which can be conveniently broken by pulling the tab 14. The tube may be formed without any longitudinal sealing, however, when the reduced strength of the packages is not objectionable.

A continuous length of the formed tube, shown in Fig. 2, is made into packages by flattening or pinching the tube to close it at spaced points to form separate compartments in the tube between the flattened portions. The individual packages thus formed may then be severed from each other, along a line 24.

The packages can be made and the closed portions sealed on the machine disclosed in my copending application Serial No. 51,791, filed November 27, 1935, of which this case is a continuation in part, or by other forming and sealing means.

Ice cream 20 is inserted into the tubular enwrapment after each successive cross-sealing or pinching operation, and the next seal is preferably made at a sufficient distance above the level of the ice cream so that the inside volume of the package is somewhat greater than that of its contents. This leaves an air space 22 (Fig. 4) above the ice cream so that it can expand after packaging without tending to burst the package.

The pliofilm is tucked in on both sides of the flattened ends of the packages to prevent the ends from being substantially wider than the cylindrical or body portion of the package. This construction permits the packages to fit close together in a shipping container. The tucks 26 at the lower and upper ends of the package are shown clearly in Figs. 5 and 6, respectively. The upper end of the package is shown partly broken open.

The pliofilm is heat-sealed across the full width of the blank just above the line 24 (Figs. 3 and 4) to weld the layers of pliofilm together and seal the paper strip 12 to the pliofilm. This forms a liquid-tight seal 28 across the bottom of each package so that liquid can not drip through the lower end of the package if the ice cream melts while being held in the manner shown in Fig. 8.

Below the line 24 the pliofilm is held by a seal 30 extending for only a short distance along the center of the top of the package. The upper end of the package can be pulled open to the extent shown in Fig. 6 without breaking the seal 30, and when in this condition the purchaser has a firm grip on the paper portion of the package and can easily break the seal 30.

The top of the package may, however be sealed across a greater or less portion of its width, or even across its entire width, but it is a feature of the invention that the seal at the top of the package is one that can be easily broken by hand and without using a knife or other implement.

Fig. 7 shows a package similar to that shown in Figs. 3—6, but with different contents. A preformed, form-retaining comestible comprising a filler 32 covered by a chocolate coating 33 is shown in the package in Fig. 7. This pre-formed comestible may be square or rectangular in cross-section, and does not have a snug fit in the package as does the ice cream 20.

The special advantages of the package as a container for individual portions of ice cream have been pointed out, but it is a convenient, inexpensive, and attractive germ-proof package for other products besides ice cream. It will be apparent that the package is not limited to the particular embodiment which has been illustrated and described.

I claim:

1. A package comprising a thin, flexible, chlorinated rubber bag welded at both ends, and a paper strip extending from one end of the bag to the other and welded to the outside surface of the rubber material over a portion of the width of said strip to give some rigidity to the package, said strip having an unattached edge forming a tab which extends along the length of the package and serves as a handle for the package.

2. A package comprising a tubular, thin, flexible, chlorinated rubber strip similarly welded at both ends substantially to close the ends of the package, and a paper strip extending from one end of the package to the other, said strip being of a stock stiffer than the rubber material and being welded thereto over a substantial area of the rubber material to give the package more rigidity so that it tends to maintain its form.

3. A substantially cylindrical package for an individual portion of ice cream comprising a strip of thin, flexible, liquid-proof chlorinated rubber material shaped to give it the cylindrical form of the package and welded at both ends to close the ends of the package, a strip of stiffer material covering a portion of the circumference of the package and extending lengthwise of said package, the latter strip being welded to said liquid-proof material with the weld extending lengthwise of the package to increase the stiffness of the package, there being tucks at both ends of the tubular strip at the said end welds, said tucks reducing the width of the package at the ends thereof.

4. An ice cream package comprising a thin, flexible, chlorinated rubber bag adapted to contain ice cream and having a welded seal at the bottom and having a manually partible seam extending from top to bottom, said seam being adapted to be opened progressively from the top to the bottom thereof to progressively expose the ice cream for consumption, and an insulating paper sheet welded to and covering a part of the outside of the bag, said sheet having a free edge portion forming a holding tab by means of which the package can be manually held by the consumer, said paper sheet serving to protect the rubber bag from contact with the hand of the consumer.

CLARENCE W. VOGT.